United States Patent

[11] 3,607,410

[72] Inventor Carl Berger
 13401 Kootenay, Santa Ana, Calif. 92705
[21] Appl. No. 680,861
[22] Filed Nov. 6, 1967
[45] Patented Sept. 21, 1971

[54] HIGH POWER DENSITY GALVANIC CELL
 23 Claims, 1 Drawing Fig.
[52] U.S. Cl. ................................................ 136/30,
 136/86, 136/120
[51] Int. Cl. ..................................................... H01m 13/00,
 H01m 27/04
[50] Field of Search ........................................ 136/152,
 143, 86, 86 D, 30, 120

[56] References Cited
 UNITED STATES PATENTS
 3,125,468  3/1964  Thompson et al. ............ 136/86 (D)

| | | | |
|---|---|---|---|
| 3,228,797 | 1/1966 | Brown et al. ............ | 136/86 |
| 3,228,798 | 1/1966 | Hart ............................ | 136/86 (D) |
| 3,287,171 | 11/1966 | Holt ............................ | 136/86 X |
| 3,351,492 | 11/1967 | Heyes et al. ................ | 136/86 (D) |
| 3,410,726 | 11/1968 | Harivel ........................ | 136/143 |
| 3,186,877 | 6/1965 | Stanimirovitch ............ | 136/143 |
| 2,669,595 | 12/1950 | Gary ............................ | 136/152 |

Primary Examiner—Benjamin R. Padgett
Assistant Examiner—Harvey E. Behrend
Attorney—Max Geldin ABSTRACT: This invention relates to a novel element in galvanic cells, applicable to fuel cells and batteries. The inclusion of hollow porous capillaries increases greatly the electrode surface area in a given volume yielding substantially larger power densities than conventional systems.

PATENTED SEP 21 1971 3,607,410
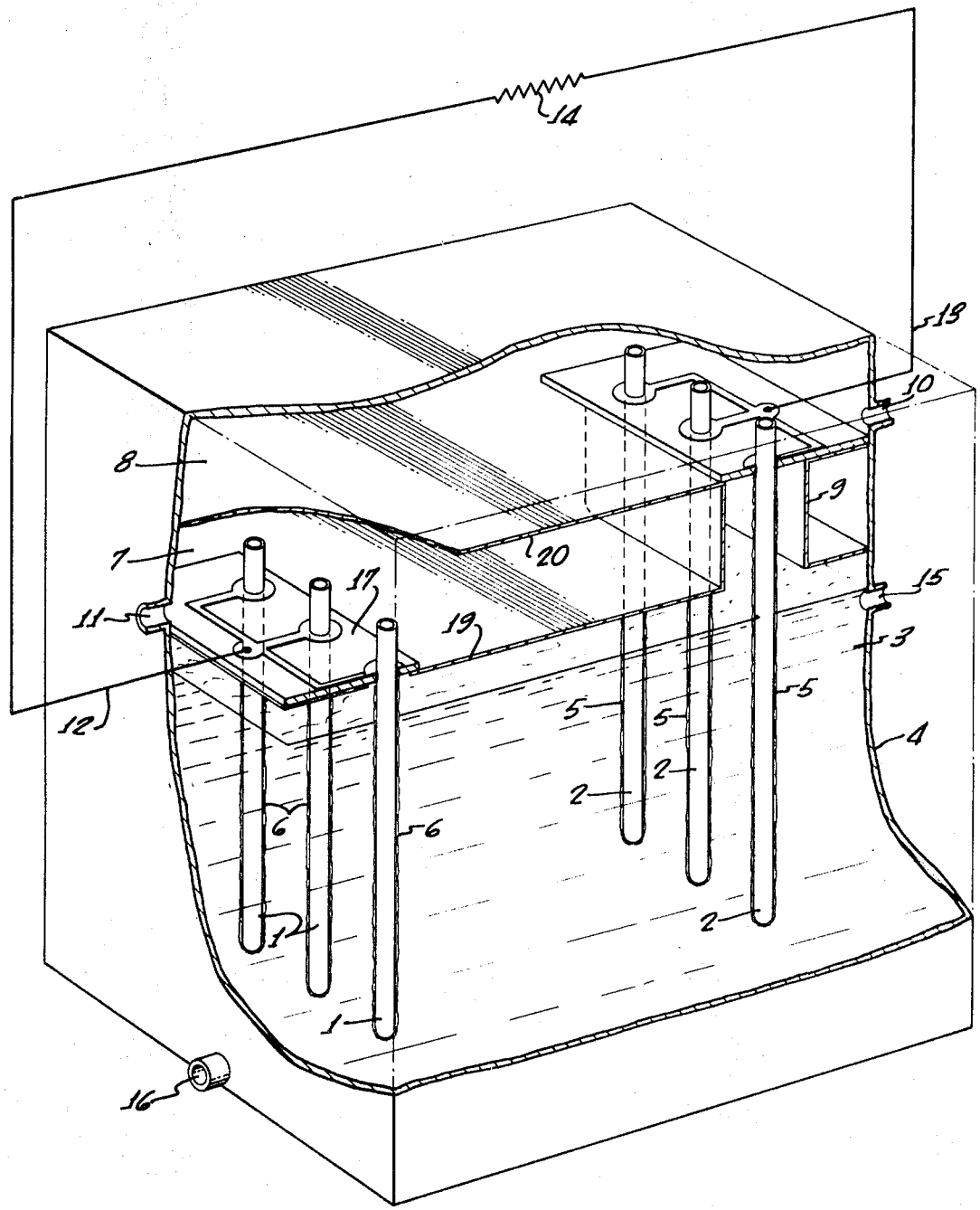
INVENTOR.
Carl Berger

HIGH POWER DENSITY GALVANIC CELL

This invention relates to a novel galvanic cell so constituted as to produce high energy density power at optimal operating conditions, which include low current density and low polarization.

In recent years a considerable amount of effort has been invested in producing a variety of fuel cells. This is adequately described in a review by M. Barak in Advanced Energy Conversion, Vol. 6, pp. 29-55 (1966). Major activities have been devoted to finding high performance catalysts so that high current densities and thereby high-power densities may be achieved. The limitations in this approach are both technical and economic. At high current densities deterioration of catalysts sets in after relatively short periods of time. Moreover, at high current densities, the voltage of the cell tends to be lower due to polarization. Finally, high-performance catalysts usually fall into the family of noble metals which are very expensive.

The present invention provides a system where high performance may be achieved at low current densities, high voltage and with inexpensive catalysts, when appropriate. We can make the observation that intrinsically we are seeking the product of current density times area at a given voltage. In three dimensional terms, this is realistically a volume factor since all areas encompass a given volume. At low current densities, a high area per unit volume ratio could yield large power densities. Analytical studies indicated that a series of microchannels of appropriate diameter could fulfill these area requirements. Having fulfilled the high area to volume ratio factor, other considerations must be met. These are sufficient gas or fluid flow through the microchannel conduit to the electrode area, wet proofing properties (preferably intrinsic) and capability for operating over desired pressures and temperatures. Our investigations led us to materials which possessed these properties. One example of such a material is a fused inorganic glass made up of about 4 percent $B_2O_3$, $Al_2O_3$, $Cr_2O_3$ and 96 percent silicon dioxide. After the leaching process such a glass in capillary form serves as the basis for a version of a Microchannel (MC) fuel cell. Many of these capillaries properly manifolded and electrically joined and with a catalyst deposited on their surfaces form the operating module of the (MC) fuel cell.

It should be recognized that if the (MC) fuel cell utilizes high performance catalysts available today, performance orders of magnitude higher than presently available systems could be achieved for performance periods equal to present systems. For instance, using a 0.5 mm. diameter capillary at 10 ma./cm.$^2$ and 0.8 v. a power density of 0.1 watt/gram is achieved. In the Proceedings of the 19th Power Sources Conference, a fue cell configuration running at 150 ma./cm.$^2$ at 0.8 v. had a power density of 0.05 watt/gram. It can further be seen that if the (MC) fuel cell were to be run at the latter current density and voltage that a power density of 1.5 watt/gram would be achieved, 30 times the rating of the conventional fuel cell.

An object of this invention is to provide a fuel cell device capable of producing higher power densities than conventional fuel cells at lower current densities and voltages, thereby utilizing lower cost catalysts and longer, more reliable life.

Another object of this invention is to provide a fuel cell device whose electrode members are composed in part of hollow porous capillaries with catalyst situated on the walls of the capillaries, said fuel cell having far greater energy density than conventional fuel cells.

Another object of this invention is to provide an electrode consisting in part of hollow capillaries with porous walls and a catalytically active material situated on wall of the capillary all of the capillaries being electrically joined.

Another object of this invention is to provide a process for generating direct current and electrochemically converting fuel cell reactants in the (MC) fuel cell more efficiently than possible previously in conventional galvanic devices.

Another object of this invention is to provide a galvanic cell whose parts will consist of an anode, a cathode, electrolyte and hollow capillaries with porous walls.

Another object of this invention is to provide a battery cell comprising anode, cathode, electrolyte and hollow capillaries with porous wall, said capillaries serving as a separator.

The invention may be depicted in more detail by describing the operation if one form of the device shown in the Figure. 1 and 2 represent anode and cathode micro channel conduits sealed at the lower end and open at the upper end. The conduits or capillaries are shown for the purposes of clarity in perspective but in this configuration actually are lined up with the row of anode conduits parallel to the row of cathode conduits. Both groups of conduits have deposited on them catalytically active material represented by 5 and 6. The anode and cathode assemblies are immersed in the electrolyte 3 contained in the cell case 4. The anode capillaries 1 are supported in the cell cover 19 and protrude into the anode fluid manifold 7. The catalytically active anode coatings 6 terminate in the cell cover contacting the electron conductive current collector 17. 17 may be in the form of a printed circuit board. In a similar manner the catalytically active cathode coatings 5 terminate in the anode fluid manifold cover 20. The cathode capillaries themselves terminate in the cathode fluid manifold 8. The cathode capillaries are shielded in passing through the anode fluid manifold by a tube 9 sealed at the upper and lower openings to 19 and 20. Anode fluid (e.g. $H_2$) passes through the opening 11 and down the tubes 1, through the porous walls of the tube and is oxidized at the catalytic layer 6 with a loss of electrons and conversion of the anode fluid to an electron poor condition

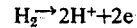

$$H_2 \rightarrow 2H^+ + 2e$$

The cathode fluid (e.g. $O_2$) follows a similar course through the cathode entrance 10, down the cathode conduits 2 and reaction at the catalytic layer 5 wherein electrons are gained and an electron rich product results. The net effect is the formation of reactant products in the electrolyte and a flow of current through the lead wires 12 and 13 and through the external resistance 14. The electrolyte 3 may be circulated through the ports 15 and 16 in order to limit concentration polarization at the electrodes and to remove the products of reaction, if desired. If the electrolyte is a solid such as an ion exchange membrane or asbestos 15 and 16 are not required for electrolyte circulation.

It is understood that FIG. 1 is a characterization of the implementation of the MC fuel cell and the principle could be utilized in other types described in the Barak article. These would be such as acid and alkaline liquid electrolytes, ion exchange and asbestos matrix types.

A number of conduit material may be used. For instance, glass products may be leached so as to provide pores in the range 10 to 1500 Angstroms. Such a material is Corning glass no. 7930 and Porasil. Corning glass no. 7930 has been tested and specifically has a pore size range of 35–45° A. Other materials such as polytetrafluoroethylene, polyvinyl chloride and other polymers with pore sizes in the appropriate range may also be utilized preferably in capillary form. Porous metals such as tantalum may also be used.

Anode fluids which may be commonly utilized are gaseous hydrogen, carbon monoxide, hydrocarbons, alcohols and hydrazine. Liquids such as higher alkanes may also be utilized but higher pressures will be required to have the liquid permeate the conduit to the catalytic layer. Cathode fluids include gaseous oxygen, chlorine, sulfur dioxide and fluorine. Liquids such as nitrobenzene may also be utilized but will also require increased pressure for permeation through the porous conduit. Although operation for gaseous fluids at atmospheric pressure is preferred, increased pressure can be used to increase gas flow and thereby current density.

All commonly used electrolytes, aqueous and nonaqueous may be used. These include alkali hydroxide solutions such as KOH, NaOH and acid solutions such as sulfuric acid, phosphoric acid and hydrochloric acid. Aqueous saline solutions and nonaqueous solvents such as butyrolactone and propylene carbonate, containing perchlorate salts, can also be utilized.

An important element of this invention is the catalytic coating. Because of the order of magnitude increase in surface area available, low current densities may be utilized. Therefore, we may use less expensive low performance catalysts such as 1–5 percent noble metals or base metals on carbon, base metal oxides of cobalt, nickel, tungsten and iron. Silver and nickel boride may also be utilized. Low-performance noble metals (small quantities per unit area) also can be utilized.

As described above, the use of the porous capillary group serves to produce far more surface area in a given volume than the planar electrodes conventionally used. Using a 0.5 mm. diameter capillary, the ratio of surface area to volume is 60 $cm.^2/cm.^3$ whereas a planar surface contains only 1 $cm.^2/cm.^3$. In practicality, the spacing for the (MC) fuel cell area is reduced by a factor of four to provide for electrolyte spacing and other engineering requirements and still has a great advantage over planar electrodes conventionally used. The capillaries themselves may be employed in parallel rows as indicated in FIG. 1, or other geometrical groupings may be utilized. Such may be clusters, concentric groupings and other configurations as are warranted by systems requirements.

Other modifications of the invention are possible. For instance, catalyst or electrode material can be placed on the interior of the capillary. One example of how this might be used is to run a zinc-air cell where air would be channeled on the inside of capillary and zinc paste would be on the exterior. Electrolyte would be placed into the pores of capillary in this instance. Another possible application would be to have no catalyst at all but to use electrode mixes or solutions on the interior and exterior of the capillary. The latter is a battery with electrolyte retained in the capillary. An example of this could be zinc paste in the interior and silver oxide electrode on outer side of capillary. Finally the capillary may be used in different forms and shapes rather than the straight cylinder form illustrated in FIG. 1.

The following examples are illustrative of the invention:

Example 1

An apparatus similar to FIG. 1 was assembled and anode and cathode capillaries 0.5 mm. in diameter of the Corning Glass 07930 were utilized for both electrodes. 0.25 $cm.^3$ of capillaries were utilized for the anode and cathode. The capillaries were sensitized with stannous chloride and a platinum salt reduced on the surface by immersion. The resulting platinum catalyst is a thin, low-performance catalyst capable of sustaining current densities of 10–20 $ma./cm.^2$. After final assembly in the apparatus and immersion in 30 percent KOH electrolyte $H_2$ and $O_2$ gases were allowed to flow into the anode and cathode manifolds respectively at one atmosphere pressure each. The flow rate for $H_2$ was 120 $cm.^3$ per hour and for $O_2$ 60 $cm.^3$ per hour. The electrolyte spacing was 0.6 mm. between capillaries. Open circuit voltage was measured at 1.19 volts. At closed circuit a voltage of 0.8 v. at 225 ma was achieved. Using the volume in which the capillaries are deployed an energy density of 0.15 watts/gram is calculated at a current density of 16 $ma./cm.^2$. Conventional alkaline electrolyte cells performing at 150 $ma./cm.^2$ at 0.8 volt have a calculated energy density of 0.05 watt/gram. As a result of the conversion of hydrogen gas to hydrogen ion at the anode and oxygen gas to hydroxyl ion at the cathode product water formed which can be circulated through (15) and (16) of FIG. 1 and removed by evaporation if desired. In a regenerable fuel cell this would not be required. It is clear that various products can be produced depending on the anode and cathode reactants (e.g. methanol can yield formaldehyde, formic acid or just carbon dioxide and water). is Example 2:

Using the apparatus of Example 1, but substituting 40 percent $H_2SO_4$ as the electrolyte, propane gas was used as an anodic fuel and $O_2$ as the cathodic fuel. The sulfuric acid is held at 90–100° C. The rate of flow of propane gas was 60 $cm.^3$ per hour and 60 $cm.^3$ per hour for $O_2$. A closed circuit voltage of 0.65 at 150 ma. was achieved. This represents an energy density 0.075 watts/gram calculated at a current density of 10 $ma./cm.^2$. A conventional system operating at 0.65 volt and 75 $ma./cm.^2$ has an energy density of 0.02 watts/gram.

The first two examples illustrate clearly the volume and weight advantages of my invention. For the same power, reductions in weight of from two to three times or more has been accomplished. The same is true for the volume factor. Moreover, it should be noted that this is accomplished with a low performance catalyst which will run thousands of hours without deterioration. Conventional systems utilize high performance catalysts whose life time at high current densities is measured only in hundreds of hours. It should be noted that, if high performance catalysts were used in the instant invention at high current densities (presuming the long life time requirement is not needed) then reduction in weight and volumes are far greater than stated in this paragraph.

Example 3:

The same experiment as that depicted in Example 1 was performed using a Porasil Type A capillary instead of the Corning Glass No. 7930. The pore diameter of the latter is 35–45° A. The Porasil Type A is about 100 A. in diameter. A voltage reading of 0.8 volt at 190 ma. was obtained on closed circuit.

Example 4:

The same apparatus and procedure as Example 2 was employed except that the capillary material is tantalum which was lightly platinized before sealing in place. At 0.69 volt, 150 ma. was observed during closed circuit performance.

Example 5:

All the conditions of Example 1 were employed except that the conduit material is polytetrafluoroethylene. At 0.8 volt, 210 ma. was generated.

Example 6:

All the conditions of Example 2 were employed except that the conduit material is polyvinylchloride. At 0.65 volt, 160 ma. is observed.

It should be noted that the fuel cell described in Example 1 can be recharged if required and the gases collected and stored for a subsequent discharge. This is not the case for nonregenerable gases such as propane or hydrazine. It is also possible in the preceding examples to use air instead of oxygen but a detriment in performance results.

Since $N_2$ from the air may also collect in the conduit, a continuous fluid circulation system unlike FIG. 1 could be required. The capillary would not be sealed but would empty into other manifolds similar to 7 and 8 in FIG. 1.

Finally, the catalysts described herein may be employed with various water proofing materials such as wax, teflon and silicones if greater water repellency is required. This is usually not required because of the inherent water proofing characteristics of the capillaries.

Example 7:

The same apparatus and procedure as Example 1 was employed except that Nickel Boride was used on the anode and silver on the cathode as catalysts. Performance noted was 0.78 volt and 220 ma.

Example 8:

The same apparatus and procedure as Example 1 was used but carbon supported platinum (5percent) was used on the anode as the catalyst. Performance noted was 0.73 volt and 185 ma.

Example 9:

The procedure of Example 1 was followed except that the cathode catalyst was carbon supported cobalt oxide. At 0.75 volt, 150 ma. of current was obtained during closed circuit performance.

Example 10:

The same apparatus and procedure as Example 2 was employed except that methanol was used as the anodic fuel. After the cell ran at 0.5 volt and 100 ma. for two hours, the electrolyte was tested for formic acid and the test proved positive.

Example 11:

A cluster of capillaries with a thin platinum coating on the exterior of the capillaries was used as a zinc-$O_2$ cell. Moist zinc in 40 percent KOH was placed in the interior of the capillary with a silver contact wire protruding from capillary. All of the wires were joined to form a common anode. $O_2$ was introduced into the void space between the capillaries and the platinum catalyst on the capillaries served as the $O_2$ cathode. All cathodes were also united electrically and connected to the anode through an outside load. The KOH solution in the capillary walls serves as the electrolyte. When the circuit was closed a voltage of 0.98 and an amperage of 200 ma. was observed. This cell may also be recharged to serve as a secondary device. It is also possible to invert the position of the zinc and air electrode as described previously.

Example 12:

The same configuration as in Example 11 was employed except that silver oxide is placed in the void space between the capillaries. An open circuit voltage of 1.86 was established. On closing the circuit a voltage of 1.35 and an amperage of 230 ma. was observed. This cell may be recharged to serve as a secondary device.

TABLE OF ABBREVIATIONS

Micro Channel   (MC)
milliamperes per square centimeters ma./cm.$^2$
volt   v.
millimeter   mm.
for example   e.g.
square centimeter   cm$^2$
cubic centimeter   cm$^3$
Hydrogen   $H_2$
Oxygen   $O_2$
Nitrogen   $N_2$
Hydrogen ion   $H^+$
Boron Oxide   $B_2O_3$
Aluminum Oxide   $Al_2O_3$
Chromium Oxide   $Cr_2O_3$
Angstrom unit   A.

Having described the invention, I claim:

1. A fuel cell comprising anode and cathode members and means connected to said members for transmitting generated electrical energy; said anode and said cathode members each consisting essentially of a plurality of hollow capillary conduits, each of said conduits having an internal surface ad an external surface and porous walls of nonionic material selected from the group consisting of glass and plastics, said external surface having a surface coating of active catalyst electrode material, said coating being in direct contact with said porous walls, and an electrolyte in contact with said anodic and cathodic capillary conduits.

2. The fuel cell of claim 1 wherein the porous walls of said capillary conduits are glass.

3. The fuel cell of claim 2 wherein said porous walls have pore diameters in the range 20–100 Angstroms.

4. The fuel cell of claim 3 wherein said glass is constituted of about 96 percent silicon dioxide and about 4 percent of $B_2O_3$, $Al_2O_3$, $Cr_2O_3$ and the pore diameter of said porous walls is 35–45 A.

5. The fuel cell of claim 1 wherein the active catalyst material coated on the anodic capillary conduits is selected from the group consisting of noble metals, metal borides and carbon supported noble metals.

6. The fuel cell of claim 1 wherein the active catalyst material coated on the cathodic capillary conduits is selected from the group consisting of the Group 1B metals, Group VIII transition metals and carbon supported base metals.

7. The fuel cell of claim 1 wherein the active catalyst material is a noble metal.

8. The fuel cell of claim 7 wherein the noble metal is platinum.

9. An electrode consisting essentially of a hollow capillary conduit, said conduit having an internal surface and an external surface and porous walls of nonionic material selected from the group consisting of glass and plastics, at one of said surfaces having a surface coating selected from the group consisting of active catalyst electrode material and active battery electrode material, said coating being in direct contact with said porous walls.

10. The electrode of claim 9 wherein the porous walls are glass.

11. The glass of claim 10 wherein the porous walls are constituted of about 96 percent silicon dioxide and about 4 percent of $B_2O_3$, $Al_2O_3$, $Cr_2O_3$ and the pore diameter is 35–45 A.

12. The electrode of claim 7 wherein the electrode material is an anode catalyst selected from the group consisting of noble metals, metal borides and carbon supported noble metals.

13. The electrode of claim 9 wherein the electrode material is a cathode catalyst selected from the group consisting of Group IB metals, Group VIII transition metals and carbon supported base metals.

14. The electrode of claim 9 wherein the electrode material is a noble metal catalyst.

15. A galvanic cell comprising anode, cathode and electrolyte, said anode and said cathode each consisting essentially of a plurality of hollow capillary conduits, each of said conduits having an internal surface and an external surface and porous walls of nonionic material selected from the group consisting of glass and plastics, at least one of said surfaces having a surface coating selected from the group consisting of active catalyst electrode material and active battery electrode material, said coating being in direct contact with said porous walls, said electrolyte being in contact with said anodic and cathodic capillary conduits.

16. The galvanic cell of claim 15 wherein the galvanic cell is a is a fuel cell.

17. The galvanic cell of claim 15 wherein the galvanic cell is a battery cell.

18. The battery cell of claim 17 wherein the electrode material of said cathode is platinum and of the anode zinc.

19. The battery cell of claim 17 wherein the electrode material of said anode is zinc and of the cathode is silver oxide.

20. The fuel cell of claim 16 wherein the electrode material of said anode is selected from the group consisting of noble metals, metal borides and carbon supported noble metals.

21. The fuel cell of claim 16 wherein the electrode material of said cathode is selected from the group consisting of Group IB metals, Group VIII transition metals and carbon supported base metals.

22. The galvanic cell of claim 15 wherein the hollow capillary conduits are glass.

23. The battery cell of claim 17 wherein the electrode material of one of said electrodes is an active catalyst material and the electrode material of said other electrode is an active battery electrode material.